(12) United States Patent
Balachandran et al.

(10) Patent No.: US 8,823,398 B2
(45) Date of Patent: *Sep. 2, 2014

(54) LINEAR CAPACITANCE-TO-VOLTAGE CONVERTER USING A SINGLE AMPLIFIER FOR TRANSDUCER FRONT ENDS WITH CANCELLATION OF SPURIOUS FORCES CONTRIBUTED BY SENSOR CIRCUITRY

(75) Inventors: Ganesh Balachandran, Sunnyvale, CA (US); Vladimir Petkov, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 118 days.

This patent is subject to a terminal disclaimer.

(21) Appl. No.: 13/551,652

(22) Filed: Jul. 18, 2012

(65) Prior Publication Data
US 2013/0055564 A1  Mar. 7, 2013

Related U.S. Application Data

(63) Continuation of application No. 13/224,144, filed on Sep. 1, 2011.

(51) Int. Cl.
*G01R 27/26* (2006.01)
*G01P 15/125* (2006.01)
*G01P 15/08* (2006.01)

(52) U.S. Cl.
CPC ........... *G01P 15/125* (2013.01); *G01P 15/0802* (2013.01)
USPC ........................................................ 324/679

(58) Field of Classification Search
CPC ......... G01P 15/00; G01P 15/08; G01P 15/18; G01P 15/125; G01P 15/0802; G01P 21/00; G01P 2015/0865; G01L 9/12; G01L 1/42; G01L 1/44; G01L 19/5776; B81B 2201/0235; B81B 2201/0221
USPC ........... 73/1.38, 510, 514.01, 514.16, 514.32, 73/488, 503, 724, 780; 324/658, 661, 679, 324/680, 686
See application file for complete search history.

(56) References Cited

U.S. PATENT DOCUMENTS

| 5,465,604 | A | * | 11/1995 | Sherman | 73/1.38 |
| 5,661,240 | A | * | 8/1997 | Kemp | 73/514.32 |
| 6,035,694 | A | * | 3/2000 | Dupuie et al. | 73/1.38 |
| 2005/0218911 | A1 | * | 10/2005 | Denison | 324/661 |

* cited by examiner

*Primary Examiner* — Melissa Koval
*Assistant Examiner* — Daniel Miller
(74) *Attorney, Agent, or Firm* — Maginot, Moore & Beck

(57) ABSTRACT

Capacitive transducer systems are disclosed that reduce non-linearities due to feedthrough capacitances or residual electrostatic forces. The systems can include a core with a first input coupled to a first variable capacitor, a second input coupled to a second variable capacitor, and a core output coupled to a common node; an amplifier with input switchably coupled to common node and an output; a feedback path switchably coupling amplifier output to common node; and a main clock with first and second phases, that controls switches coupling system components. When clock is in first phase, first core input is coupled to reference voltage, second core input is coupled to negative reference voltage, and common node is coupled to amplifier output. When clock is in second phase, core inputs are grounded, and common node is coupled to amplifier input. The system can have single amplifier. Neutralization capacitor can cancel feedthrough and parasitic capacitances.

13 Claims, 8 Drawing Sheets

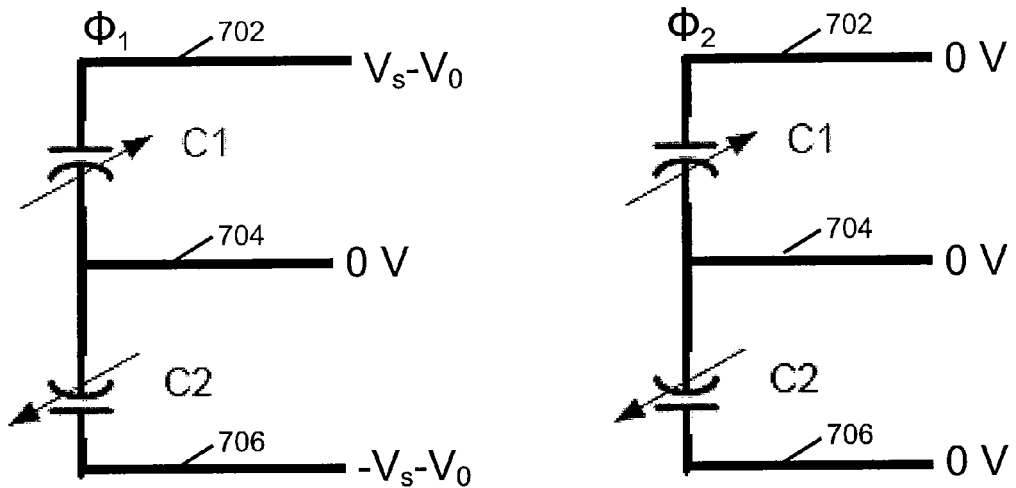
Figure 7A
PRIOR ART
Figure 7B
PRIOR ART
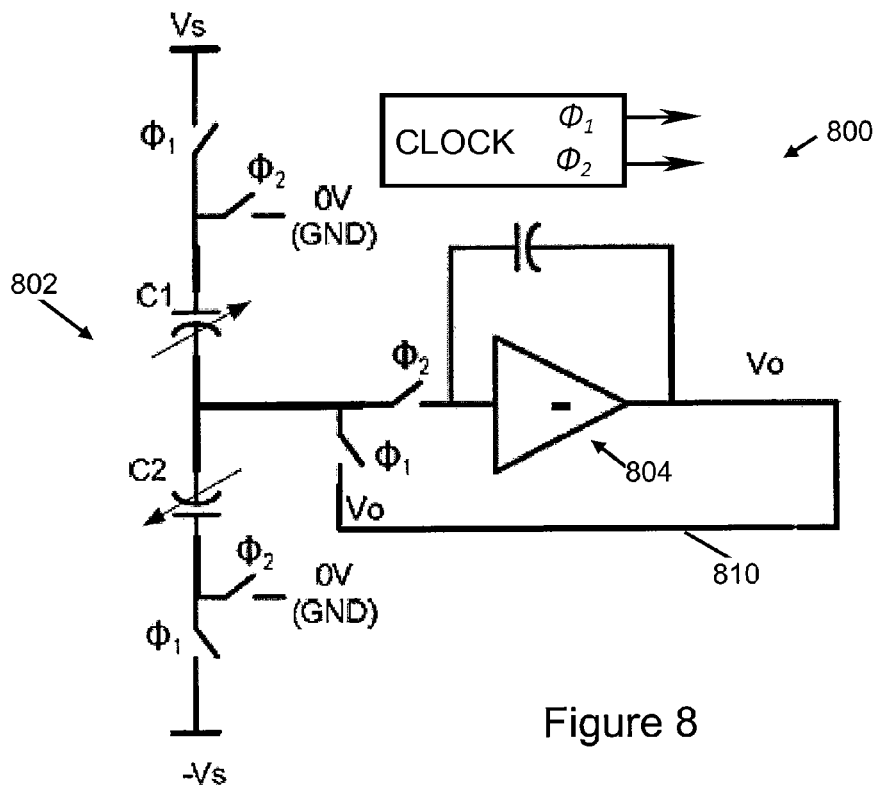
Figure 8

LINEAR CAPACITANCE-TO-VOLTAGE CONVERTER USING A SINGLE AMPLIFIER FOR TRANSDUCER FRONT ENDS WITH CANCELLATION OF SPURIOUS FORCES CONTRIBUTED BY SENSOR CIRCUITRY

CROSS REFERENCE TO RELATED APPLICATIONS

This application is a continuation of U.S. patent application Ser. No. 13/224,144, filed on Sep. 1, 2011, entitled "Linear Capacitance-to-Voltage Converter Using a Single Amplifier for Transducer Front Ends with Cancellation of Spurious Forces Contributed by Sensor Circuitry," which is incorporated herein by reference.

BACKGROUND OF THE INVENTION

This patent relates to capacitive transducers, and more particularly to techniques for reducing or eliminating nonlinearities due to spurious capacitances and residual electrostatic forces in capacitive transducers using less circuitry.

Transducers convert a general physical quantity (for example, acceleration, pressure, etc.) to quantities that can be processed by electronic circuits. In particular, capacitive transducers produce a change of capacitance, corresponding to the magnitude of the measured input signal. Readout circuits for capacitive transducers transform the capacitance change produced by the transducer to an electrical signal. In the process, the circuits apply voltage waveforms to the transducer electrodes.

A capacitive accelerometer, a capacitive transducer for measuring acceleration, includes a mechanical sensing element and a readout circuit. FIG. 1 illustrates an exemplary embodiment of a mechanical sensing element 100 of a capacitive accelerometer. In this embodiment, the mechanical sensing element 100 includes a proofmass 102 suspended between a first spring 104 and a second spring 106, a first electrode 110 and a second electrode 112. A proximal end of the mass 102 is coupled to the first spring 104 and a distal end of the mass 102 is coupled to the second spring 106. The first spring 104 has two ends; a first end coupled to the proximal end of the mass 102 and a second end coupled to a substrate. The second spring 106 has two ends; a first end coupled to the distal end of the mass 102 and a second end coupled to the substrate. A common electrode M is coupled to the mass 102 and moves with the mass 102 relative to the substrate. The first and second electrodes 110, 112 are stationary relative to the substrate. In this embodiment a positive reference voltage $V_S$ is applied to the first electrode 110 and the negative reference voltage $-V_S$ is applied to the second electrode 112. A first variable capacitor $C_1$ is formed between the first electrode 110 and the common electrode M, and a second variable capacitor $C_2$ is formed between the second electrode 112 and the common electrode M.

In this embodiment, when the system is at rest, there is a substantially equal nominal gap $g_0$ between the first electrode 110 and the common electrode M and between the second electrode 112 and the common electrode M, creating substantially equal capacitances in the first variable capacitor $C_1$ and the second variable capacitor $C_2$. An input acceleration moves the mass 102 relative to the substrate which varies the gaps between the electrodes and varies the capacitance of the variable capacitors $C_1$, $C_2$. Acceleration in the direction of arrow 120 deflects the mass 102 a distance $\Delta x$ that is proportional to the input acceleration. This movement of the mass 102 increases the distance between the first electrode 110 and the common electrode M to $g_0+\Delta x$, and decreases the distance between the second electrode 112 and the common electrode M to $g_0-\Delta x$, which changes the capacitance of capacitors $C_1$ and $C_2$. The capacitance C of variable capacitors $C_1$ and $C_2$ can be determined by:

$$C_{1/2} = \frac{\varepsilon_0 A}{g_0 \pm \Delta x} \qquad (1)$$

where $\varepsilon_0$ is dielectric permittivity, A is the area of the capacitive plates (which extend into the paper), $g_0$ is the nominal gap and $\Delta x$ is the displacement due to the acceleration. The readout circuit determines the value of $\Delta x$ based on the capacitance change in capacitors $C_1$ and $C_2$.

Accelerometers are often implemented in harsh vibration-ridden environments, for example automotive or industrial environments. In these environments, the accelerometers are typically need good linearity, low drift performance and large full scale range. Self-balanced accelerometers are usually chosen for these applications. Self-balanced accelerometers measure $(C_1-C_2)/(C_1+C_2)$.

FIG. 2 is a schematic of an exemplary embodiment of a self-balancing capacitive bridge 200. The switched-capacitor implementation shown in FIG. 2 has the advantage of straightforward DC biasing of the input without the need for a high resistance path, as well as a stable and well-defined transfer function over process and temperature. It also provides a discrete-time output signal, which can be digitized directly by an analog-to-digital converter (ADC). FIG. 2 shows a single-ended embodiment of a self-balancing bridge.

The self-balancing bridge 200 includes a sensor core and a readout or interface circuit. The sensor core 210 represents a capacitive sensor element, for example the sensing element 100 shown in FIG. 1 or one of various other capacitive sensor elements known in the art. The sensor core 210 includes two variable capacitors, $C_1$ and $C_2$, sharing a common node M that is coupled to the output of the sensor core 210. The readout circuit includes a forward path that passes the output of the sensor core 210 through an integrator 222, which provides gain, to the output $V_0$. In this embodiment, the integrator 222 includes an amplifier 224 with an integrating capacitor $C_i$. The self-balancing bridge 200 also includes a first feedback path 230 and a second feedback path 240 that feedback the output voltage $V_o$ to the sensor core 210. The first feedback path 230 feeds back the output voltage $V_o$ through a first inverting amplifier 232 to a first summing node 234. The first summing node 234 sums the inverted output voltage $-V_0$ and inverted reference voltage $-V_S$, and outputs the resulting voltage $-V_S-V_0$ to the first variable sensor capacitor $C_1$. The second feedback path 240 feeds back the output voltage $V_o$ through a second inverting amplifier 242 to a second summing node 244. The second summing node 244 sums the inverted output voltage $-V_0$ and reference voltage $V_S$, and outputs the resulting voltage $V_S-V_0$ to the second variable sensor capacitor $C_2$.

The self-balancing bridge 200 tries to equalize the absolute charge on the two sensor capacitors, $C_1$ and $C_2$. Under these conditions the output voltage is proportional to the ratio between the difference and the sum of the measured capacitors:

$$V_o = -V_s \frac{C_1 - C_2}{C_1 + C_2} \qquad (2)$$

Measuring the above ratio is of interest for a variety of applications, acceleration sensors being only one particular example.

Equation (2) shows that $V_0$ is proportional to $(C_1-C_2)/(C_1+C_2)$, and from Eq. (1) we know that C is proportional to $1/d$, where d is the distance between the capacitive plates. Combining these two relationships provides:

$$V_o \propto \frac{C_1 - C_2}{C_1 + C_2} = \frac{1/d1 - 1/d2}{1/d1 + 1/d2} = \frac{d2 - d1}{d2 + d1} = \frac{x}{d0} \quad (3)$$

where x is the displacement value, d0 is the zero displacement value, $d1=d0-x$ is the distance between the plates of capacitor $C_1$, and $d2=d0+x$ is the distance between the plates of capacitor $C_2$. Equation (3) shows that in the ideal case the output voltage $V_0$ of the self-balanced accelerometer is a linear function of the displacement x. Unfortunately, in actual implementations, there are sources of non-linearity not taken into account in Eq. (3).

The two main sources of non-linearity in self-balanced accelerometers are feedthrough capacitance and residual electrostatic force. Feedthrough capacitance (Cft) is any fixed capacitance between the proofmass and the sense electrodes. FIG. 3 illustrates the feedthrough capacitance in a capacitive core 300, an example of which is shown in FIG. 1. The capacitive core 300 includes a first capacitor C1 between a first sense electrode 302 and a proofmass 304, and a second capacitor C2 between a second sense electrode 306 and the proofmass 304. The capacitive core 300 also includes unwanted feedthrough capacitances Cft between the proofmass 304 and each of the sense electrodes 302, 306. Re-deriving Eq. (2) and Eq. (3) taking into account the feedthrough capacitances Cft provides:

$$V_o \propto \frac{C_1 - C_2}{C_1 + C_2 + 2C_{ft}} = \frac{1/d1 - 1/d2}{1/d1 + 1/d2 + \frac{2C_{ft}}{A}} = \quad (4)$$

$$\frac{d2 - d1}{d2 + d1 + \frac{2C_{ft}}{C0}\frac{d2*d1}{d0}} = \frac{x}{d0 + \frac{C_{ft}}{C0}\frac{(d0^2 - x^2)}{d0}}$$

which introduces a non-linear term $x^2$ due to the feedthrough capacitance.

Residual electrostatic forces are created on the proofmass when excitation voltages are applied to the sensor to sense the displacement of the proofmass. Single amplifier methods have been tried unsuccessfully to eliminate these residual electrostatic forces. More success has been achieved by adding additional amplifiers to the system to eliminate the residual electrostatic forces. However, these additional amplifiers can take a significant amount of chip area, approximately half of the chip area used for the self-balancing bridge itself. This additional chip area can be expensive.

One method of trying to cancel electrostatic force using a single amplifier is shown in the self-balancing capacitive bridge 400 of FIG. 4. The capacitive bridge 400 includes a capacitive core 402, an amplifier 404, and feedback paths 410, 412. The inverter at the output of the amplifier 404 is not a separate amplifier but simply represents the inverting of the outputs of the amplifier 404. The core 402 produces an output that is amplified by the amplifier 404 to produce an output Vo that is fed back to the inputs of the core 402 where it is combined with a reference voltage Vs. FIG. 5 shows the inputs and outputs of the core 402 during phase $\phi_1$ and $\phi_2$.

FIG. 5A shows the inputs and outputs of the core 402 during phase $\phi_1$. During phase $\phi_1$, the output voltage Vo is fed back to the inputs 502, 506 of the capacitors C1 and C2 of the core 402, and the output 504 of the core 402 is connected to ground. Using the relationship that $Vo=(x/d0)*Vs$, the force on the proofmass during phase $\phi_1$ can be expressed as:

$$F_{\Phi_1} = \quad (5)$$

$$\frac{1}{2}\frac{dC1}{dx}V0^2 - \frac{1}{2}\frac{dC2}{dx}V0^2 = \frac{1}{2}\frac{C0}{d0}Vs^2\left(\frac{(x/d0)^2}{(1-x/d0)^2} - \frac{(x/d0)^2}{(1+x/d0)^2}\right)$$

FIG. 5B shows the inputs and outputs of the core 402 during phase $\phi_2$. During phase $\phi_2$, the positive reference voltage Vs is provided to the input 502 of the capacitor C1, the negative reference voltage $-Vs$ is provided to the input 506 of the capacitor C2, and the output 504 of the core 402 is connected to the amplifier which provides a virtual ground. The force on the proofmass during phase $\phi_2$ can be expressed as:

$$F_{\Phi_2} = \quad (6)$$

$$\frac{1}{2}\frac{dC1}{dx}Vs^2 - \frac{1}{2}\frac{dC2}{dx}Vs^2 = \frac{1}{2}\frac{C0}{d0}Vs^2\left(\frac{1}{(1-x/d0)^2} - \frac{1}{(1+x/d0)^2}\right)$$

The residual electrostatic force on the proofmass can be calculated as the average of the forces on the proofmass during phase $\phi_1$ and $\phi_2$. Using Eq. (5) and (6), the average force is:

$$F_{avg} = (F_{\Phi_1} + F_{\Phi_2})/2 = \quad (7)$$

$$\frac{1}{4}\frac{C0}{d0}Vs^2\left(\frac{1}{(1-x/d0)^2} - \frac{1}{(1+x/d0)^2}\right)*(1 + (x/d0)^2)$$

This shows that the single amplifier self-balancing capacitive bridge 400 has a non-zero residual electrostatic force.

Another method of electrostatic force cancellation is shown in the self-balancing capacitive bridge 600 of FIG. 6. This method requires the addition of two amplifiers, specifically two summing amplifiers. The capacitive bridge 600 includes a capacitive core 602, a forward amplifier 604, two summing amplifiers 620, 622, and feedback paths 610, 612. The core 602 produces an output that is amplified by the forward amplifier 604 to produce an output Vo that is fed back on feedback paths 610, 612 to the inputs of the core 602. The summing amplifiers 620, 622 are on feedback paths 610, 612, respectively. The first summing amplifier 620 on the first feedback path 610 sums the output signal Vo with a positive reference voltage Vs and outputs Vs−Vo. The second summing amplifier 622 on the second feedback path 612 sums the output signal Vo with the negative reference voltage Vs and outputs −Vs−Vo. FIG. 7 shows the inputs and outputs of the core 602 during phase $\phi_1$ and $\phi_2$.

FIG. 7A shows the inputs and outputs of the core 602 during phase $\phi_1$. During phase $\phi_1$, the outputs of the summing amplifiers 620, 622 are coupled to the inputs 702, 706 of the capacitors C1 and C2 of the core 602, and the output 704 of the core 602 is coupled to the amplifier which provides a virtual ground. The force on the proofmass during phase $\phi_1$ can be expressed as:

$$F_{\Phi_1} = \frac{1}{2}\frac{dC1}{dx}(Vs - V0)^2 - \frac{1}{2}\frac{dC2}{dx}(Vs + V0)^2 = \qquad (8)$$
$$\frac{1}{2}\frac{C0}{d0}Vs^2\left(\frac{(1-x/d0)^2}{(1-x/d0)^2} - \frac{(1+x/d0)^2}{(1+x/d0)^2}\right) = 0$$

FIG. 7B shows the inputs and outputs of the core 602 during phase $\phi_2$. During phase $\phi_2$, the inputs 702, 706 of both capacitors C1, C2 are coupled to ground and the output 704 of the core 602 is coupled to ground. Since all of the voltages on the core are 0 V during phase $\phi_2$, the force on the proofmass $F_{\phi1}$ is also zero.

The residual electrostatic force on the proofmass can be calculated as the average of the forces on the proofmass during phase $\phi_1$ and $\phi_2$. Since, as shown above, the force on the proofmass during both phases $\phi_1$ and $\phi_2$ is zero (0), the average force is also zero (0). Thus, the self-balancing capacitive bridge 600 of FIG. 6 does cancel the electrostatic force, but it requires two additional summing amplifiers 620, 622 to accomplish this cancellation. These two additional summing amplifiers can take up a significant amount of chip space, approximately half the chip area of the capacitive bridge. This additional chip area can be a significant expense.

It would be desirable to reduce or eliminate the nonlinearity due to feedthrough and parasitic capacitances, and it would also be desirable to reduce or eliminate the nonlinearity due to residual electrostatic forces using less additional circuitry without requiring significant additional chip area, such as by the summing amplifiers of the embodiment 600. Reducing or eliminating either or both of these unwanted effects would reduce primary sources of non-linearity in self-balanced capacitive bridges.

SUMMARY OF THE INVENTION

A capacitive transducer system that senses a physical quantity is disclosed. The capacitive transducer system includes a capacitive core, an amplifier, a feedback path and a main clock. The capacitive core generates a core output based on the physical quantity, and includes a first variable capacitor, a second variable capacitor, a first core input coupled to the first variable capacitor, a second core input coupled to the second variable capacitor, and a core output coupled to a common node between the first variable capacitor and the second variable capacitor. The amplifier has an input and an output, where the amplifier input is switchably coupled to the common node for receiving the core output, and the amplifier output provides a transducer output. The feedback path switchably couples the transducer output to the common node of the capacitive core. The main clock has a first phase and a second phase, and controls the opening and closing of switches coupling components of the capacitive transducer system. When the main clock is in the first phase, the first input of the capacitive core is coupled to a positive reference voltage, the second input of the capacitive core is coupled to a negative reference voltage, and the common node of the capacitive core is coupled to the transducer output. The negative reference voltage has substantially the same magnitude and opposite polarity as the positive reference voltage. When the main clock is in the second phase, the first and second inputs of the capacitive core are coupled to ground, and the common node of the capacitive core is coupled to the amplifier input. The amplifier can be the only amplifier in the capacitive transducer system.

The capacitive transducer system can also include a neutralization capacitor that cancels feedthrough and parasitic capacitances in the capacitive transducer system. The neutralization capacitor can be calibrated to offset feedthrough and parasitic capacitances in the capacitive transducer system. The neutralization capacitor can be switchably coupled to the amplifier input and to the transducer output, such that when the main clock is in the first phase, the neutralization capacitor is coupled to the transducer output, and when the main clock is in the second phase, the neutralization capacitor is coupled to the common node of the capacitive core which is coupled to the amplifier input.

The capacitive core can include a first stationary capacitive plate, a second stationary capacitive plate, a first movable capacitive plate and a second movable capacitive plate; where the first movable capacitive plate is coupled to the second movable capacitive plate to form the common node, the first variable capacitor is formed by the first stationary capacitive plate and the first movable capacitive plate, and the second variable capacitor is formed by the second stationary capacitive plate and the second movable capacitive plate.

A differential capacitive transducer system is disclosed that includes first and second capacitive cores, a differential amplifier, first and second feedback paths, and a main clock. The first and second capacitive cores generate first and second core outputs, respectively, based on a physical quantity. The first capacitive core includes a first variable capacitor, a second variable capacitor, a first core input coupled to the first variable capacitor, a second core input coupled to the second variable capacitor, and a first core output coupled to a first common node between the first variable capacitor and the second variable capacitor. The second capacitive core includes a third variable capacitor, a fourth variable capacitor, a third core input coupled to the third variable capacitor, a fourth core input coupled to the fourth variable capacitor, and a second core output coupled to a second common node between the third variable capacitor and the fourth variable capacitor. The differential amplifier has a pair of differential inputs and a pair of differential outputs, where the differential inputs are switchably coupled to the first and second common nodes for receiving the first and second core outputs, and the differential outputs provide the transducer output. The first feedback path switchably couples the transducer output to the first common node of the first capacitive core. The second feedback path switchably couples the transducer output to the second common node of the second capacitive core. The main clock has a first phase and a second phase, and controls the opening and closing of switches coupling components of the capacitive transducer system. When the main clock is in the first phase, the first input of the first capacitive core is coupled to a positive reference voltage, the second input of the first capacitive core is coupled to a negative reference voltage, the first common node of the first capacitive core is coupled to the transducer output, the third input of the second capacitive core is coupled to a positive reference voltage, the fourth input of the second capacitive core is coupled to a negative reference voltage, and the second common node of the second capacitive core is coupled to the inverted transducer output. The negative reference voltage has substantially the same magnitude and opposite polarity as the positive reference voltage. When the main clock is in the second phase, the first, second, third and fourth inputs of the capacitive core are coupled to a common mode voltage, and the common nodes of the first and second capacitive cores are coupled to the differential inputs of the differential amplifier. The pair of differential inputs of the differential amplifier can include an inverting input and a non-inverting input and the pair of differential outputs of the differential amplifier can include an inverting output and a non-inverting output; where the inverting input is switchably coupled to the first common node of the first capacitive core, the non-inverting input is switchably coupled to the second common node of the second capacitive core, the inverting output is switchably coupled to the second common node of the second capacitive core and the non-inverting output is switchably coupled to the first common node of the first capacitive core. The differential amplifier can be the only amplifier in the differential capacitive transducer system.

The differential capacitive transducer system can also include a neutralization capacitor that cancels feedthrough and parasitic capacitances in the differential capacitive transducer system. The neutralization capacitor can be calibrated to offset feedthrough and parasitic capacitances in the differential capacitive transducer system. The neutralization capacitor can be switchably coupled to the differential amplifier inputs and to the differential amplifier outputs, such that when the main clock is in the first phase, the neutralization capacitor is coupled between the differential outputs of the differential amplifier, and when the main clock is in the second phase, the neutralization capacitor is coupled between the differential inputs of the differential amplifier which are coupled to the first and second common nodes of the first and second capacitive cores.

The first capacitive core can include a first stationary capacitive plate, a second stationary capacitive plate, a first movable capacitive plate and a second movable capacitive plate; where the first movable capacitive plate is coupled to the second movable capacitive plate to form the first common node; the first variable capacitor is formed by the first stationary capacitive plate and the first movable capacitive plate; and the second variable capacitor is formed by the second stationary capacitive plate and the second movable capacitive plate. The second capacitive core can include a third stationary capacitive plate, a fourth stationary capacitive plate, a third movable capacitive plate and a fourth movable capacitive plate; where the third movable capacitive plate is coupled to the fourth movable capacitive plate to form the second common node; the third variable capacitor is formed by the third stationary capacitive plate and the third movable capacitive plate; and the fourth variable capacitor is formed by the fourth stationary capacitive plate and the fourth movable capacitive plate. The first variable capacitor and the third variable capacitor can react substantially the same to the physical quantity, and the second variable capacitor and the fourth variable capacitor can react substantially the same to the physical quantity.

A differential capacitive transducer system is disclosed that includes first and second capacitive cores, a differential amplifier, first and second feedback paths, and a main clock. The first and second capacitive cores generate first and second core outputs based on a physical quantity. The first capacitive core includes a first variable capacitor, a second variable capacitor, a first core input coupled to the first variable capacitor, a second core input coupled to the second variable capacitor, and a first core output coupled to a first common node between the first variable capacitor and the second variable capacitor. The second capacitive core includes a third variable capacitor, a fourth variable capacitor, a third core input coupled to the third variable capacitor, a fourth core input coupled to the fourth variable capacitor, and a second core output coupled to a second common node between the third variable capacitor and the fourth variable capacitor. The differential amplifier has an inverting input, a non-inverting input, an inverting output and a non-inverting output, where the inverting input is switchably coupled to the first common node of the first capacitive core, the non-inverting input is switchably coupled to the second common node of the second capacitive core, the inverting output is switchably coupled to the second common node of the second capacitive core and the non-inverting output is switchably coupled to the first common node of the first capacitive core. The first feedback path switchably couples the non-inverting output of the differential amplifier to the first common node of the first capacitive core. The second feedback path switchably couples the inverting output of the differential amplifier to the second common node of the second capacitive core. The main clock has a first phase and a second phase, and controls the opening and closing of switches coupling components of the capacitive transducer system. When the main clock is in the first phase, the first input of the first capacitive core is coupled to a positive reference voltage, the second input of the first capacitive core is coupled to a negative reference voltage, the first common node of the first capacitive core is coupled to the non-inverting output of the differential amplifier, the third input of the second capacitive core is coupled to a positive reference voltage, the fourth input of the second capacitive core is coupled to a negative reference voltage, the second common node of the second capacitive core is coupled to the inverting output of the differential amplifier. The negative reference voltage having substantially the same magnitude and opposite polarity as the positive reference voltage. When the main clock is in the second phase, the first, second, third and fourth inputs of the capacitive core are coupled to a common mode voltage, the first common node of the first capacitive core is coupled to the inverting input of the differential amplifier, and the second common node of the second capacitive core is coupled to the non-inverting input of the differential amplifier. The differential amplifier can be the only amplifier in the differential capacitive transducer system. The differential capacitive transducer system can also include a neutralization capacitor that cancels feedthrough and parasitic capacitances in the differential capacitive transducer system. The neutralization capacitor can be switchably coupled to the differential amplifier inputs and to the differential amplifier outputs, such that when the main clock is in the first phase, the neutralization capacitor is coupled between the differential outputs of the differential amplifier, and when the main clock is in the second phase, the neutralization capacitor is coupled between the differential inputs of the differential amplifier which are coupled to the first and second common nodes of the first and second capacitive cores.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIGS. 7A and 7B show the inputs and output of the capacitive core of FIG. 6 during phase $\phi_1$ and $\phi_2$, respectively;

FIG. 8 shows an exemplary embodiment of a single ended self-balancing capacitive bridge that uses a single amplifier and reduces or eliminates the nonlinearity due to both feedthrough capacitance and residual electrostatic forces;

Figure 1:
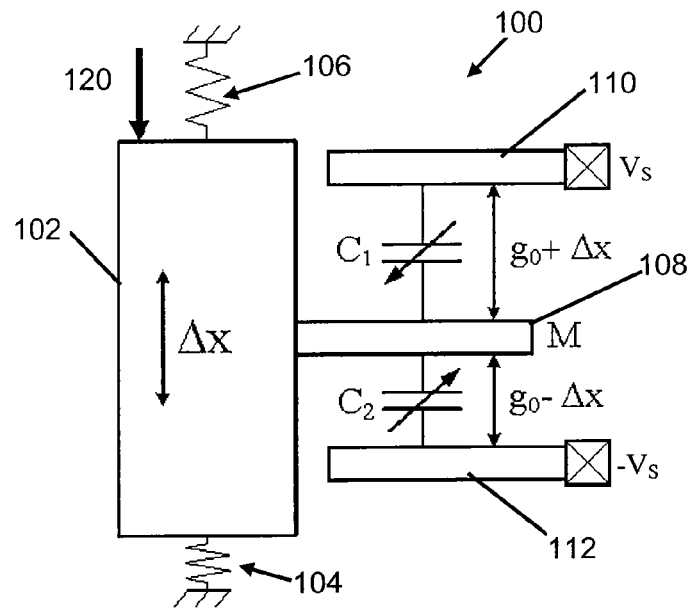
FIG. 1 illustrates an exemplary embodiment of a mechanical sensing element of a capacitive transducer.
Figure 2:
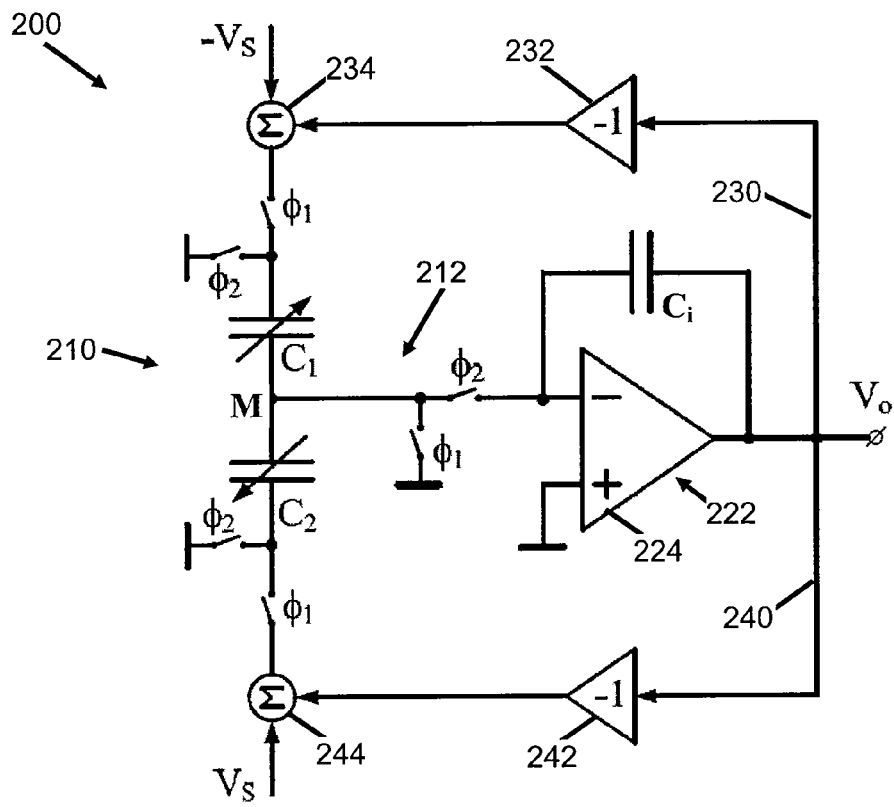
FIG. 2 is a schematic of an exemplary embodiment of a single-ended self-balancing capacitive bridge.
Figure 3:
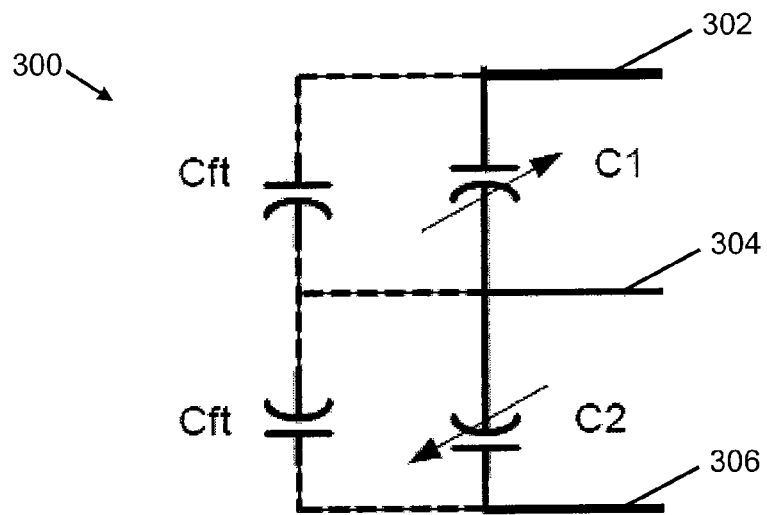
FIG. 3 illustrates the feedthrough capacitance in a capacitive core.
Figure 4:
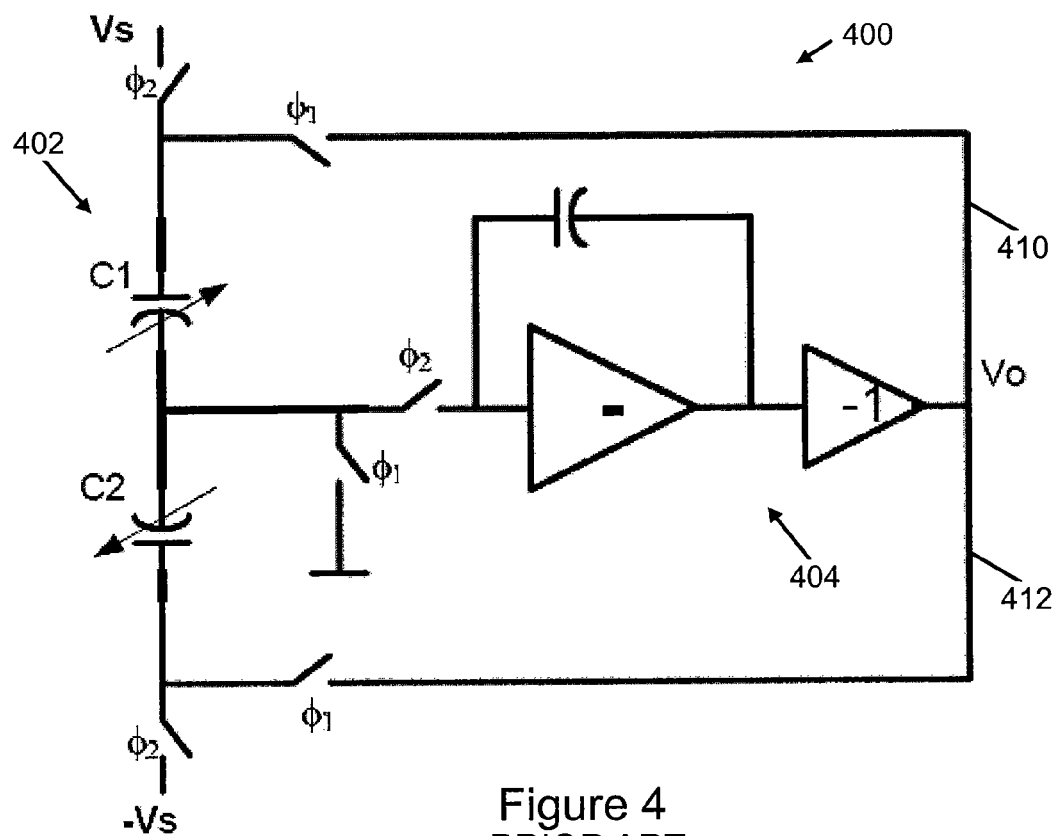
FIG. 4 illustrates an exemplary technique of trying to cancel electrostatic force using a single amplifier in a single ended self-balancing capacitive bridge.
Figure 5A:
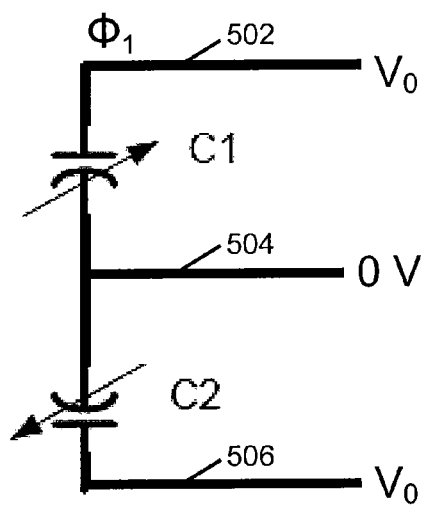
FIGS. 5A and 5B show the inputs and output of the capacitive core of FIG. 4 during phase $\phi_1$ and $\phi_2$, respectively.
Figure 5B:
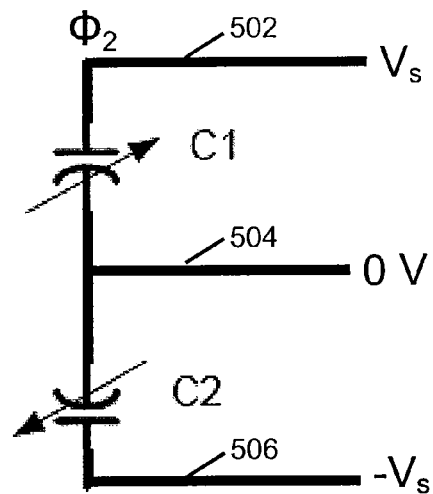
Figure 6:
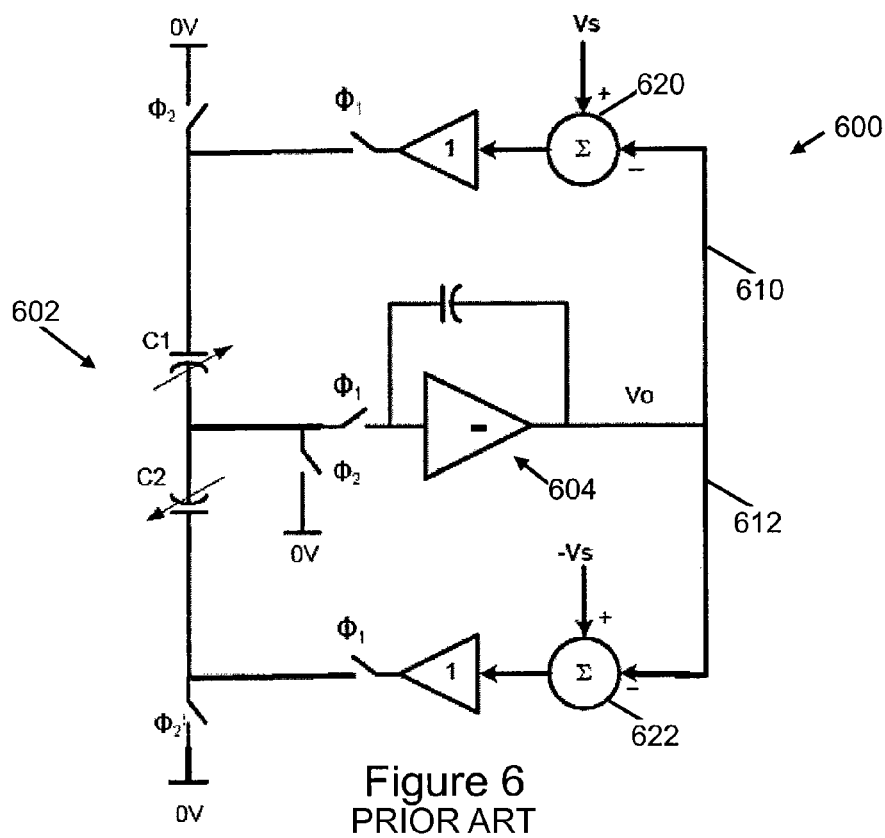
FIG. 6 illustrates an exemplary technique of trying to cancel electrostatic force using a pair of summing amplifiers in a single ended self-balancing capacitive bridge.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF EXEMPLARY EMBODIMENTS

FIG. 8 shows an exemplary embodiment of a single ended self-balancing capacitive bridge 800 that uses a single amplifier and reduces or eliminates the nonlinearity due to both feedthrough capacitance and residual electrostatic forces. The capacitive bridge 800 includes a capacitive core 802, an amplifier 804 and a single feedback path 810 that feeds the output voltage Vo back to the output or common node of the core 802 instead of to the inputs of the core 802. Positive and negative reference voltages, Vs and -Vs, are switchably coupled to the inputs of the core 802. The output voltage Vo is fed back and switchably coupled to the output of the core 802.

Figure 9:
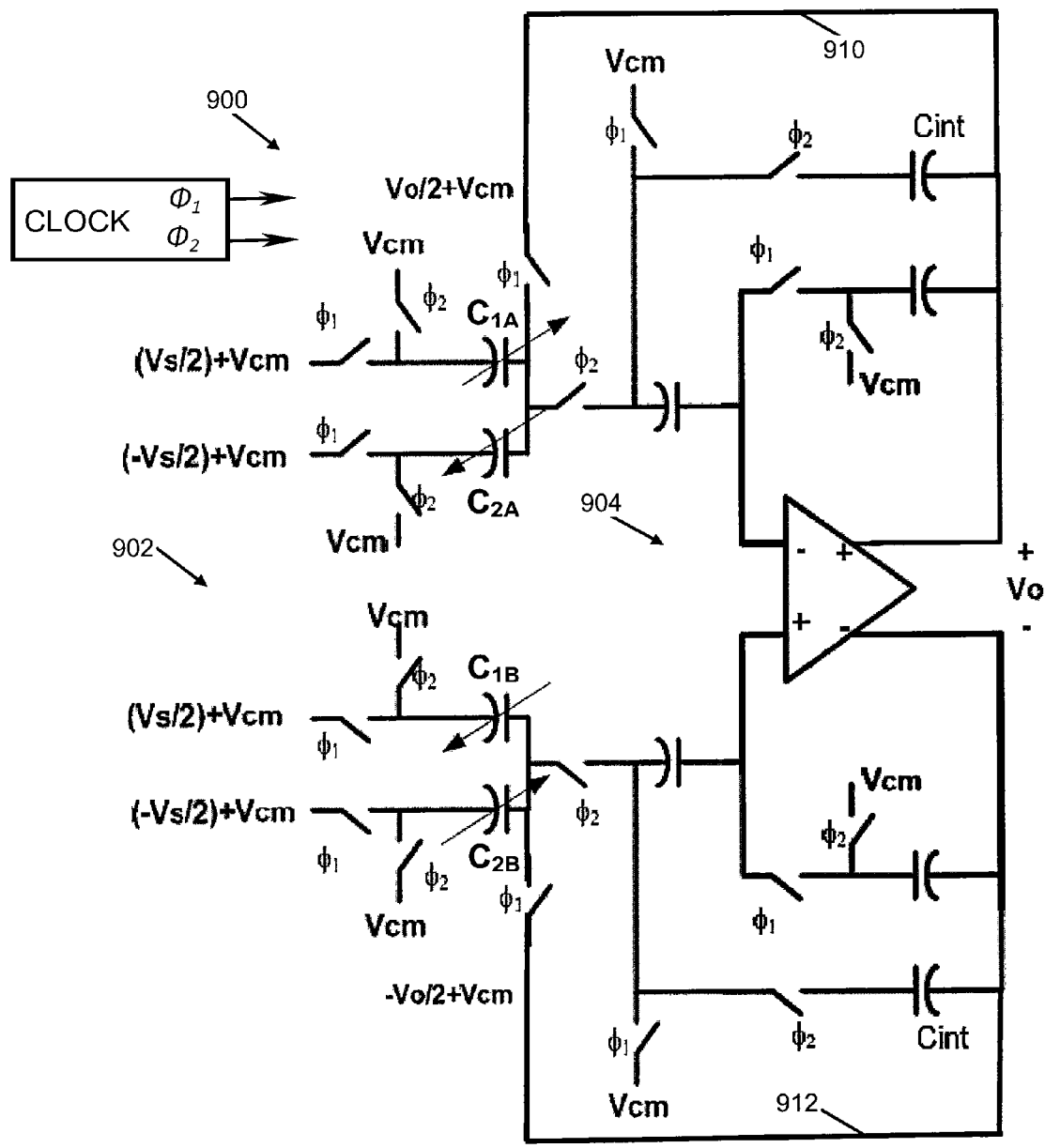
FIG. 9 shows an exemplary embodiment of a differential self-balancing capacitive bridge that uses a single differential amplifier and reduces or eliminates the nonlinearity due to both feedthrough capacitance and residual electrostatic forces.

FIG. 9 shows an exemplary embodiment of a differential self-balancing capacitive bridge 900 that uses a single amplifier and reduces or eliminates the nonlinearity due to both feedthrough capacitance and residual electrostatic forces. The differential capacitive bridge 900 includes a sensing element 902, an amplifier 904 and two dual feedback paths 910, 912. In the differential system 900, the transducer 902 is implemented as two separate cores, a first core $C_A$ and a second core $C_B$. The first core $C_A$ includes variable capacitors $C_{1A}$ and $C_{2A}$ that share a common node coupled to the output of the first core $C_A$. The second core $C_B$ includes variable capacitors $C_{1B}$ and $C_{2B}$ that share a common node coupled to the output of the second core $C_B$. The corresponding capacitors of the two cores can react to the input signal in a substantially identical way (i.e., $C_{1A}=C_{1B}$ and $C_{2A}=C_{2B}$). However, the electrical signals processed by the two cores have opposite polarity. In such designs any external interference appears as a "common-mode" signal and is rejected by the readout circuit. The voltage Vcm represents the common mode voltage.

The first feedback path 910 is switchably coupled to the common node of the first core $C_A$, and the first feedback path 910 feeds back the output voltage Vo/2 to the common node of the first core $C_A$. The second feedback path 912 is switchably coupled to the common node of the second core $C_B$, and the second feedback path 912 feeds back the inverted output voltage -Vo/2 to the common node of the second core $C_B$. The inverting input of the amplifier 904 is switchably coupled to the common node of the first core $C_A$, and the non-inverting input of the amplifier 904 is switchably coupled to the common node of the second core $C_B$. Positive and negative reference voltages, Vs/2 and -Vs/2, are switchably coupled to the inputs of the variable capacitors $C_{1A}$ and $C_{2A}$ of the first core $C_A$, and are switchably coupled to the inputs of the variable capacitors $C_{1B}$ and $C_{2B}$ of the second core $C_B$.

Figure 10A:
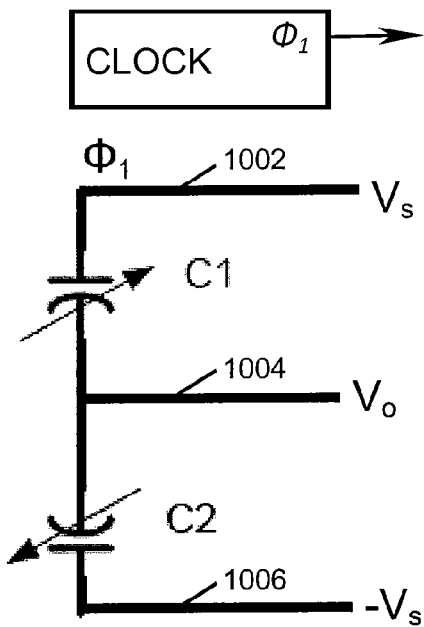
FIGS. 10A and 10B show the inputs and outputs of the capacitive core of FIG. 8 during phase $\phi_1$ and $\phi_2$, which are also the inputs and outputs of the first and second cores $C_A$ and $C_B$ of the sensing element of FIG. 9, with the common terms and common mode voltage removed.

FIG. 10 shows the input and outputs of the core 802 during phase $\phi_1$ and $\phi_2$. These are also the inputs and outputs of the first core $C_A$ and the second core $C_B$ of the sensing element 902, with the common terms and common mode voltage removed. FIG. 10A shows the inputs and outputs during phase $\phi_1$. During phase $\phi1$, the inputs 1002, 1006 of the capacitors C1 and C2 are coupled to the reference voltages, Vs and -Vs, and the common node or output is coupled to the output voltage Vo. Thus, the voltage across capacitor C1 is Vs-Vo and the voltage across the capacitor C2 is -Vs-Vo. The force on the proofmass during phase $\phi_1$ can be expressed as:

$$F_{\Phi_1} = \frac{1}{2}\frac{dC1}{dx}(Vs-V0)^2 - \frac{1}{2}\frac{dC2}{dx}(Vs+V0)^2 = \qquad (9)$$
$$\frac{1}{2}\frac{C0}{d0}Vs^2\left(\frac{(1-x/d0)^2}{(1-x/d0)^2} - \frac{(1+x/d0)^2}{(1+x/d0)^2}\right) = 0$$

Figure 10B:
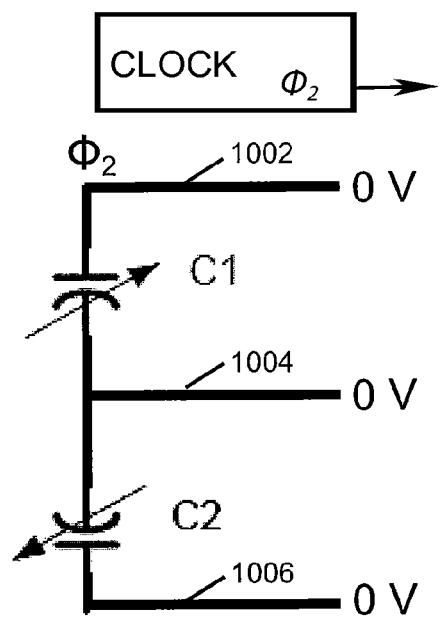

FIG. 10B shows the inputs and outputs during phase $\phi_2$. During phase $\phi_2$, the inputs 1002, 1006 of both capacitors C1, C2 are coupled to ground or the common mode voltage Vcm, and the common node or output 1004 is coupled to the amplifier which provides a virtual ground or the common mode voltage Vcm. Since all of the voltages on the core are 0 V or the same during phase $\phi_2$, the force on the proofmass $F_{\phi1}$ is also zero.

Since the force on the proofmass during both phases $\phi_1$ and $\phi_2$ is zero (0), the average force or the residual electrostatic force on the proofmass is also zero (0). Thus, the single ended self-balancing capacitive bridge 800 of FIG. 8 and the differential self-balancing capacitive bridge 900 of FIG. 9 both cancel the electrostatic force using a single amplifier.

Figure 11:
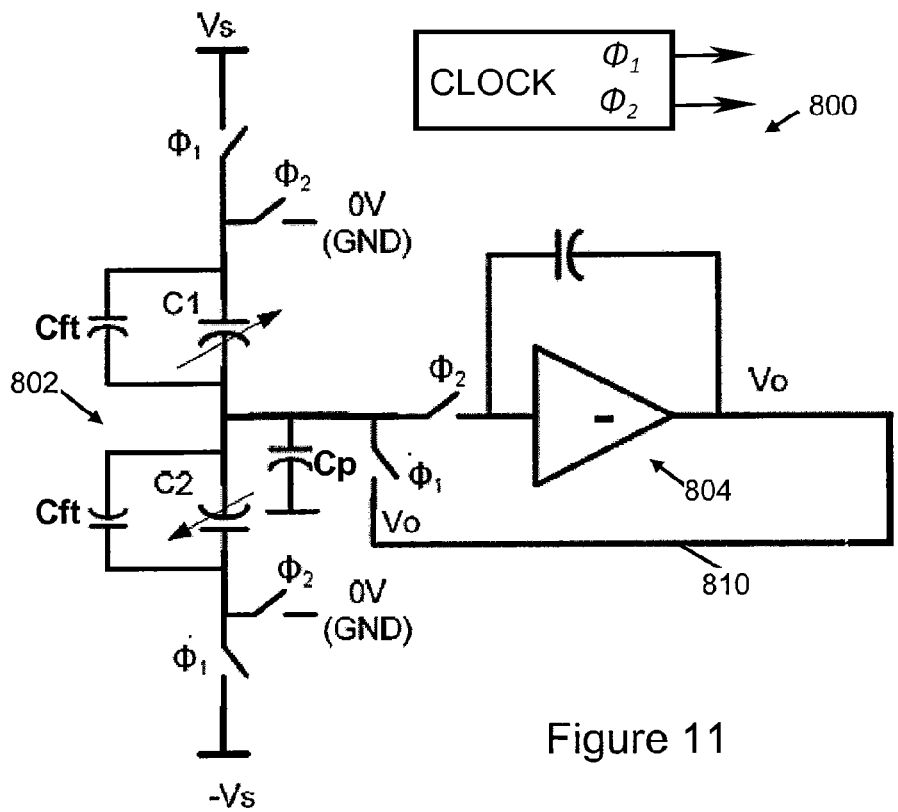
FIG. 11 shows the single ended self-balancing capacitive bridge of FIG. 8 with the feedthrough capacitances Cft and the parasitic capacitance Cp.

FIG. 11 shows the single ended self-balancing capacitive bridge 800 of FIG. 8 with the feedthrough capacitances Cft between the proofmass and sense electrodes of the core 802, and the parasitic capacitance Cp which is mostly due to the parasitic capacitance from the microelectromechanical (MEMS) proofmass to the MEMS substrate. In the presence of these feedthrough and parasitic capacitances, the transfer function becomes:

$$\frac{Vo}{Vs} = \frac{C1-C2}{C1+C2+2Cft+Cp} \qquad (10)$$

The feedthrough and parasitic capacitance term 2 Cft+Cp causes the unwanted non-linearity.

Figure 12:
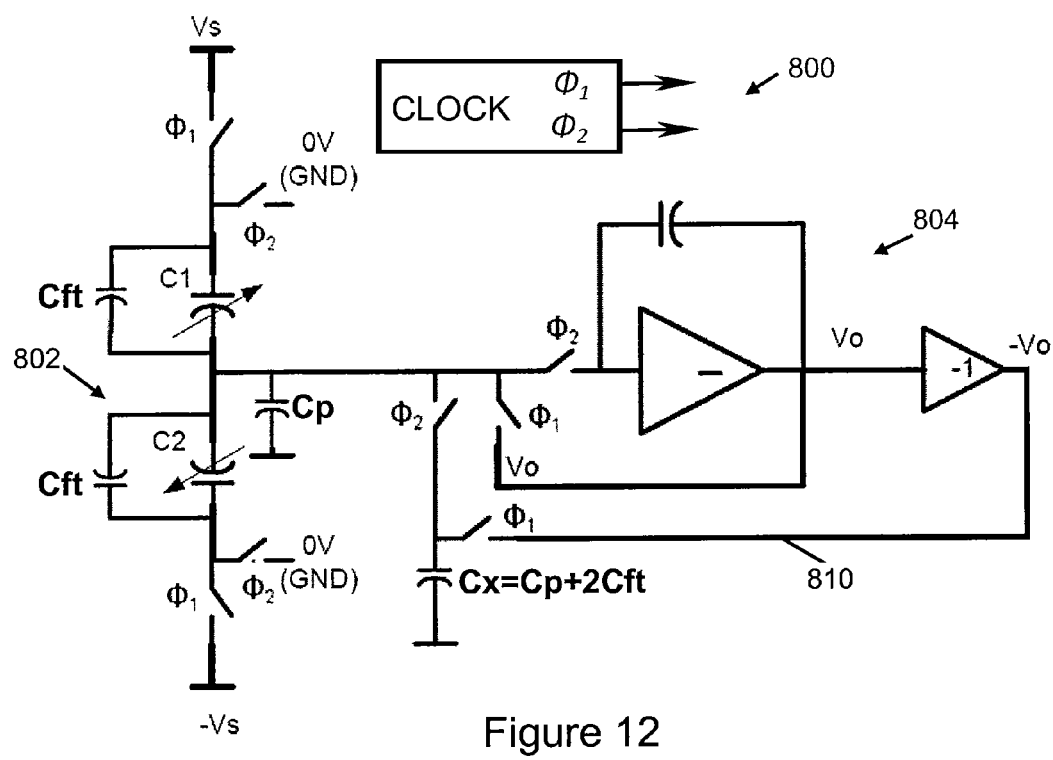
FIG. 12 shows the single ended self-balancing capacitive bridge of FIG. 8 with the feedthrough capacitances Cft and parasitic capacitance Cp, and also an on-chip neutralization capacitor Cx.

FIG. 12 shows the single ended self-balancing capacitive bridge 800 of FIG. 8 with the feedthrough capacitances Cft and the parasitic capacitance Cp, and also an on-chip neutralization capacitor Cx. The on-chip neutralization capacitor can be nominally factory trimmed through a circuit calibration to offset the feedthrough and parasitic capacitances, Cx=Cp+2 Cft. The inverter at the output of the amplifier 804 is not a separate amplifier but simply represents the inverting of the outputs of the amplifier 804. By including the neutralization capacitor Cx, the transfer function becomes:

$$\frac{Vo}{Vs} = \frac{C1 - C2}{C1 + C2 + 2Cft + Cp - Cx} = \frac{C1 - C2}{C1 + C2} \quad (11)$$

The neutralization capacitor substantially cancels the feedthrough and parasitic capacitances, and thus substantially eliminates or at least reduces the unwanted non-linearity due to the feedthrough and parasitic capacitances.

Figure 13:
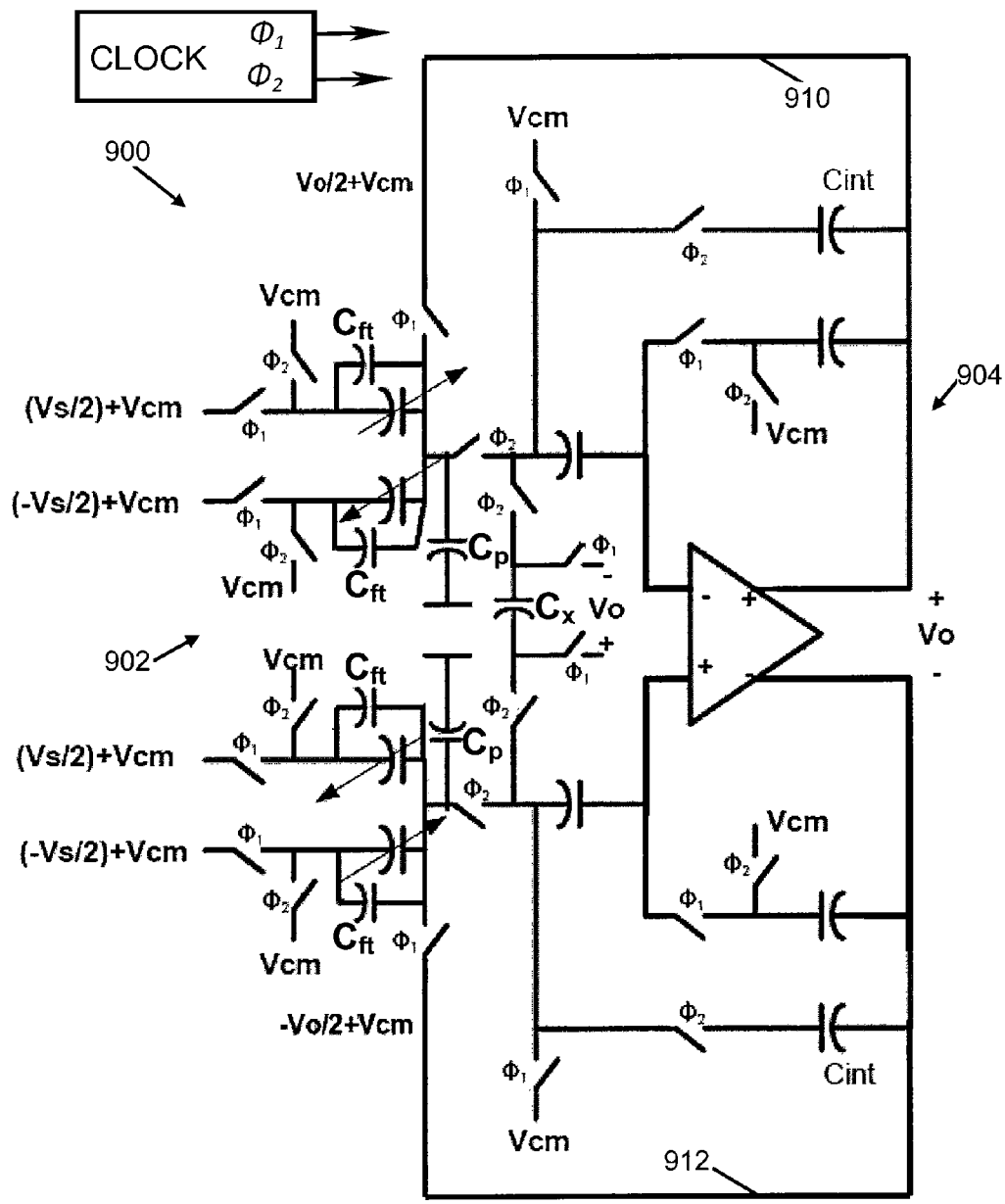
FIG. 13 shows the differential self-balancing capacitive bridge of FIG. 9 with the feedthrough capacitances Cft and parasitic capacitances Cp along with the on-chip neutralization capacitor Cx.

FIG. 13 shows the differential self-balancing capacitive bridge 900 of FIG. 9 with the feedthrough capacitances Cft between the proofmass and sense electrodes of the cores, and the parasitic capacitances Cp between the proofmass and the substrate of the cores, along with the on-chip neutralization capacitor Cx. As with the single ended bridge, the on-chip neutralization capacitor Cx can be nominally factory trimmed through a circuit calibration to offset the feedthrough and parasitic capacitances Cp and Cft. The neutralization capacitor is selected to substantially cancel the feedthrough and parasitic capacitances, and thus substantially eliminates or at least reduces the unwanted non-linearity due to the feedthrough and parasitic capacitances.

Thus, FIG. 8 shows an exemplary embodiment of a single ended self-balancing capacitive bridge, and FIG. 9 shows an exemplary embodiment of a differential self-balancing capacitive bridge, that reduce or eliminate the nonlinearities due to feedthrough and parasitic capacitances and due to residual electrostatic forces using less additional circuitry. These exemplary embodiments eliminate or reduce primary sources of non-linearity in self-balanced capacitive bridges without requiring significant additional chip area, such as by the addition of summing amplifiers.

While this invention has been described as having an exemplary design, the present invention may be further modified within the spirit and scope of this disclosure. This application is therefore intended to cover any variations, uses, or adaptations of the invention using its general principles.

We claim:

1. A method for making a differential capacitive transducer system capable of sensing a physical quantity, the method comprising:
obtaining a first capacitive core for generating a first core output based on the physical quantity, the first capacitive core including a first variable capacitor, a second variable capacitor, a first core input coupled to the first variable capacitor, a second core input coupled to the second variable capacitor, and a first core output coupled to a first common node between the first variable capacitor and the second variable capacitor;
obtaining a second capacitive core for generating a second core output based on the physical quantity, the second capacitive core including a third variable capacitor, a fourth variable capacitor, a third core input coupled to the third variable capacitor, a fourth core input coupled to the fourth variable capacitor, and a second core output coupled to a second common node between the third variable capacitor and the fourth variable capacitor;
switchably coupling a single differential amplifier to the first and second common nodes for receiving the first and second core outputs, the differential amplifier having a pair of differential inputs and a pair of differential outputs, the differential outputs providing the transducer output;
switchably coupling the transducer output to the first and second common nodes of the first and second capacitive cores;
controlling the opening and closing of switches coupling components of the differential capacitive transducer system using a main clock having a first phase and a second phase; wherein when the main clock is in the first phase, coupling the first core input of the first capacitive core to a positive reference voltage, coupling the second core input of the first capacitive core to a negative reference voltage, the negative reference voltage having substantially the same magnitude and opposite polarity as the positive reference voltage;
coupling the first common node of the first capacitive core to the transducer output, coupling the third core input of the second capacitive core to the positive reference voltage, coupling the fourth core input of the second capacitive core to the negative reference voltage, and coupling the second common node of the second capacitive core to the transducer output; and when the main clock is in the second phase, coupling the first, second, third and fourth core inputs of the first and second capacitive cores to a common mode voltage, and coupling the common nodes of the first and second capacitive cores to the differential inputs of the differential amplifier.

2. The method of claim 1, wherein the pair of differential inputs of the differential amplifier includes an inverting input and a non-inverting input and the pair of differential outputs of the differential amplifier includes an inverting output and a non-inverting output; wherein switchably coupling a differential amplifier to the first and second common nodes comprises switchably coupling the inverting input to the first common node of the first capacitive core, and switchably coupling the non-inverting input to the second common node of the second capacitive core, and wherein switchably coupling the transducer output to the first and second common nodes comprises switchably coupling the inverting output to the second common node of the second capacitive core and switchably coupling the non-inverting output to the first common node of the first capacitive core.

3. The method of claim 2, further comprising cancelling feedthrough capacitances in the differential capacitive transducer system using a neutralization capacitor.

4. The method of claim 2, further comprising cancelling parasitic capacitances in the differential capacitive transducer system using a neutralization capacitor.

5. The method of claim 2, further comprising cancelling feedthrough and parasitic capacitances in the differential capacitive transducer system using a neutralization capacitor.

6. The method of claim 5, further comprising calibrating the neutralization capacitor to offset feedthrough and parasitic capacitances in the differential capacitive transducer system.

7. The method of claim 5, wherein cancelling feedthrough and parasitic capacitances using a neutralization capacitor comprises switchably coupling the neutralization capacitor to the differential amplifier inputs and to the differential amplifier outputs by coupling the neutralization capacitor between the differential outputs of the differential amplifier when the main clock is in the first phase, and coupling the neutralization capacitor between the differential inputs of the differential amplifier when the main clock is in the second phase.

8. The method of claim 7, wherein the first capacitive core comprises a first stationary capacitive plate, a second stationary capacitive plate, a first movable capacitive plate and a second movable capacitive plate; the first movable capacitive plate being coupled to the second movable capacitive plate to form the first common node; the first variable capacitor being formed by the first stationary capacitive plate and the first movable capacitive plate; and the second variable capacitor being formed by the second stationary capacitive plate and the second movable capacitive plate; and the second capacitive core comprises a third stationary capacitive plate, a fourth stationary capacitive plate, a third movable capacitive plate and a fourth movable capacitive plate; the third movable capacitive plate being coupled to the fourth movable capacitive plate to form the second common node; the third variable capacitor being formed by the third stationary capacitive plate and the third movable capacitive plate; and the fourth variable capacitor being formed by the fourth stationary capacitive plate and the fourth movable capacitive plate.

9. The method of claim 8, wherein the first variable capacitor and the third variable capacitor react substantially the same to the physical quantity, and the second variable capacitor and the fourth variable capacitor react substantially the same to the physical quantity.

10. A method for making a differential capacitive transducer system capable of sensing a physical quantity, the method comprising:
  obtaining a first capacitive core for generating a first core output based on the physical quantity, the first capacitive core including a first variable capacitor, a second variable capacitor, a first core input coupled to the first variable capacitor, a second core input coupled to the second variable capacitor, and a first core output coupled to a first common node between the first variable capacitor and the second variable capacitor; obtaining a second capacitive core for generating a second core output based on the physical quantity, the second capacitive core including a third variable capacitor, a fourth variable capacitor, a third core input coupled to the third variable capacitor, a fourth core input coupled to the fourth variable capacitor, and a second core output coupled to a second common node between the third variable capacitor and the fourth variable capacitor;
  switchably coupling a single differential amplifier having an inverting input, a non-inverting input, an inverting output and a non-inverting output to the first and second capacitive cores;
  switchably coupling the inverting input of the differential amplifier to the first common node of the first capacitive core;
  switchably coupling the non-inverting input of the differential amplifier to the second common node of the second capacitive core;
  switchably coupling the inverting output of the differential amplifier to the second common node of the second capacitive core;
  switchably coupling the non-inverting output of the differential amplifier to the first common node of the first capacitive core;
  controlling the opening and closing of switches coupling components of the capacitive transducer system using a main clock having a first phase and a second phase; wherein when the main clock is in the first phase, coupling the first input of the first capacitive core to a positive reference voltage, coupling the second input of the first capacitive core to a negative reference voltage, the negative reference voltage having substantially the same magnitude and opposite polarity as the positive reference voltage, coupling the first common node of the first capacitive core to the non-inverting output of the differential amplifier, coupling the third input of the second capacitive core to the positive reference voltage, coupling the fourth input of the second capacitive core to the negative reference voltage, coupling the second common node of the second capacitive core to the inverting output of the differential amplifier, and wherein when the main clock is in the second phase, coupling the first, second, third and fourth inputs of the capacitive core to a common mode voltage, coupling the first common node of the first capacitive core to the inverting input of the differential amplifier, and coupling the second common node of the second capacitive core to the non-inverting input of the differential amplifier.

11. The method of claim 10, further comprising cancelling feedthrough and parasitic capacitances in the differential capacitive transducer system using a neutralization capacitor.

12. The method of claim 11, wherein cancelling feedthrough and parasitic capacitances using a neutralization capacitor comprises switchably coupling the neutralization capacitor to the differential amplifier.

13. The method of claim 12, wherein switchably coupling the neutralization capacitor to the differential amplifier comprises:
  coupling the neutralization capacitor between the differential outputs of the differential amplifier when the main clock is in the first phase, and coupling the neutralization capacitor between the differential inputs of the differential amplifier when the main clock is in the second phase.

* * * * *